United States Patent
Tabata

[19]

[11] Patent Number: 6,151,060
[45] Date of Patent: *Nov. 21, 2000

[54] STEREOSCOPIC VIDEO DISPLAY APPARATUS WHICH FUSES REAL SPACE IMAGE AT FINITE DISTANCE

[75] Inventor: Seiichiro Tabata, Hino, Japan

[73] Assignee: Olympus Optical Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/759,609

[22] Filed: Dec. 5, 1996

[30] Foreign Application Priority Data

Dec. 14, 1995 [JP] Japan ................................... 7-325734

[51] Int. Cl.[7] .................................................. H04N 13/04
[52] U.S. Cl. .................................. 348/51; 345/8; 434/43
[58] Field of Search .................................. 348/42, 43, 44, 348/47, 49, 50, 51, 53; 345/8, 7; 434/29, 43, 69, 7 R, 308, 365, 238; 463/30–33, 34; H04N 13/04

[56] References Cited

U.S. PATENT DOCUMENTS

| | | | |
|---|---|---|---|
| 4,819,255 | 4/1989 | Sato | 348/42 |
| 4,897,715 | 1/1990 | Beamon, III | 358/42 |
| 4,943,852 | 7/1990 | Femno et al. | 358/88 |
| 5,283,640 | 2/1994 | Tilton | 348/42 |
| 5,495,576 | 2/1996 | Ritchey | 395/125 |
| 5,510,832 | 4/1996 | Garcia | 348/42 |
| 5,523,886 | 6/1996 | Jonson-William et al. | 359/464 |

FOREIGN PATENT DOCUMENTS 6-176131 6/1994 Japan .
6-268943 9/1994 Japan .

*Primary Examiner*—Christopher Kelley
*Assistant Examiner*—Tung Vo
*Attorney, Agent, or Firm*—Laff, Whitesel & Saret, Ltd.; J. Warren Whitesel

[57] ABSTRACT

A real space video signal processing unit generates right and left eye first video signals including corresponding images at different horizontal positions by processing a real space video signal from a single image sensing unit. An image signal generation unit generates right and left eye second image signals including corresponding images at different horizontal positions. A right eye video signal synthesis unit generates a right eye display signal by synthesizing the right eye second image signal with a partial region of the right eye first video signal. A left eye video signal synthesis unit generates a left eye display signal by synthesizing the left eye second image signal with a partial region of the left eye first video signal. These right and left eye display signals are displayed on a video display unit, so that the image sensed by the image sensing unit is fused at finite distance.

14 Claims, 15 Drawing Sheets

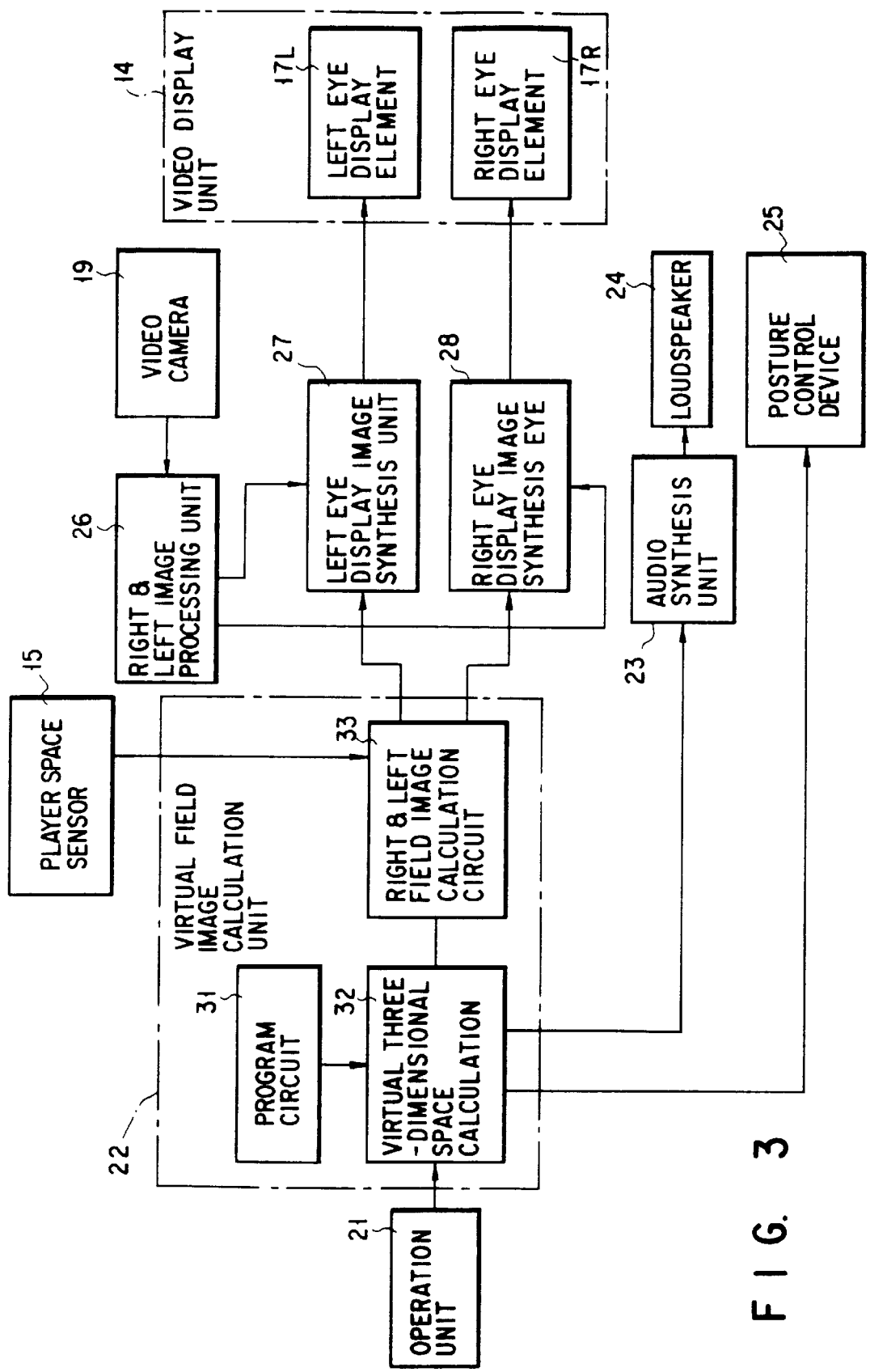
F I G. 3

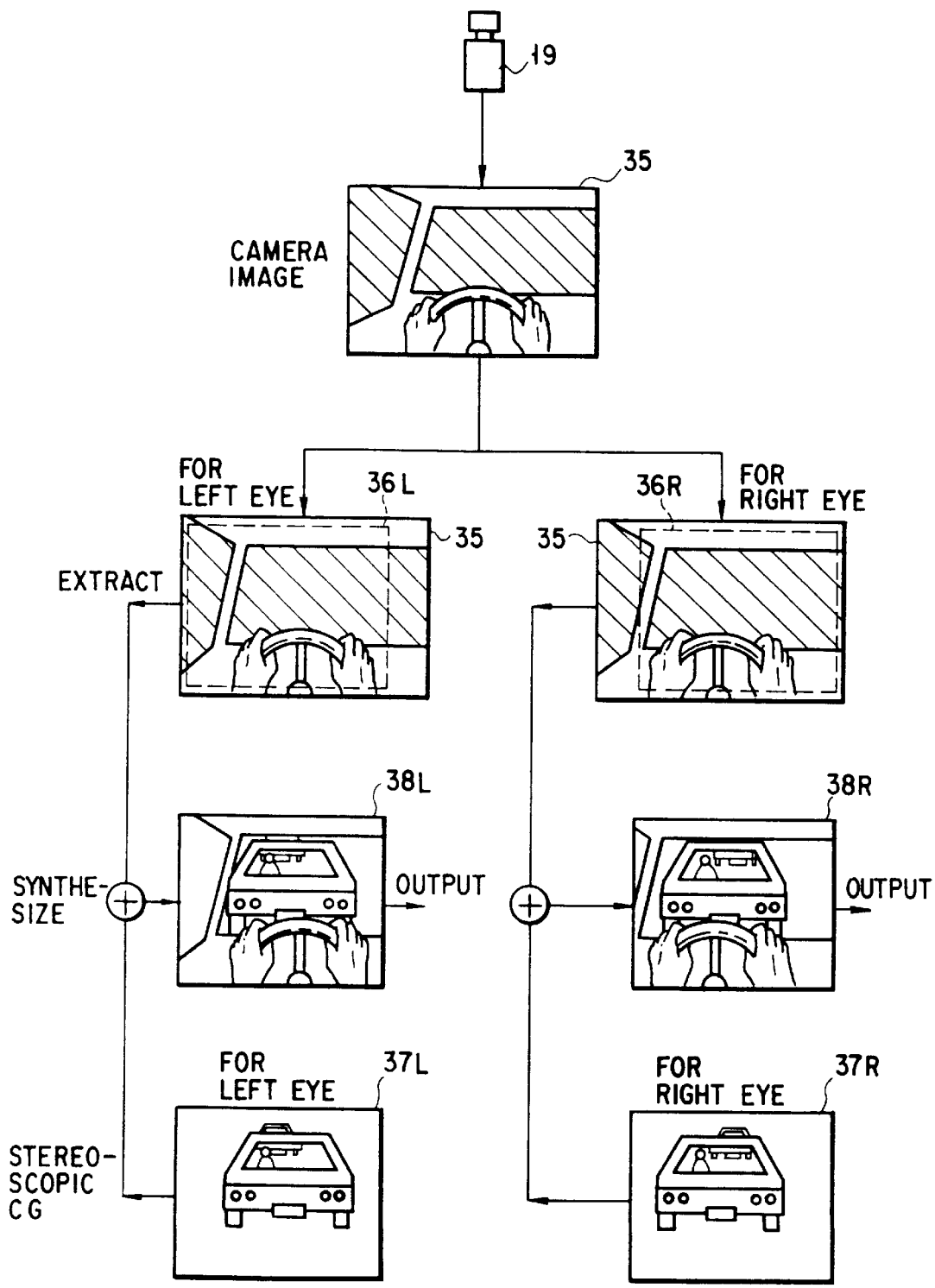
F I G. 5

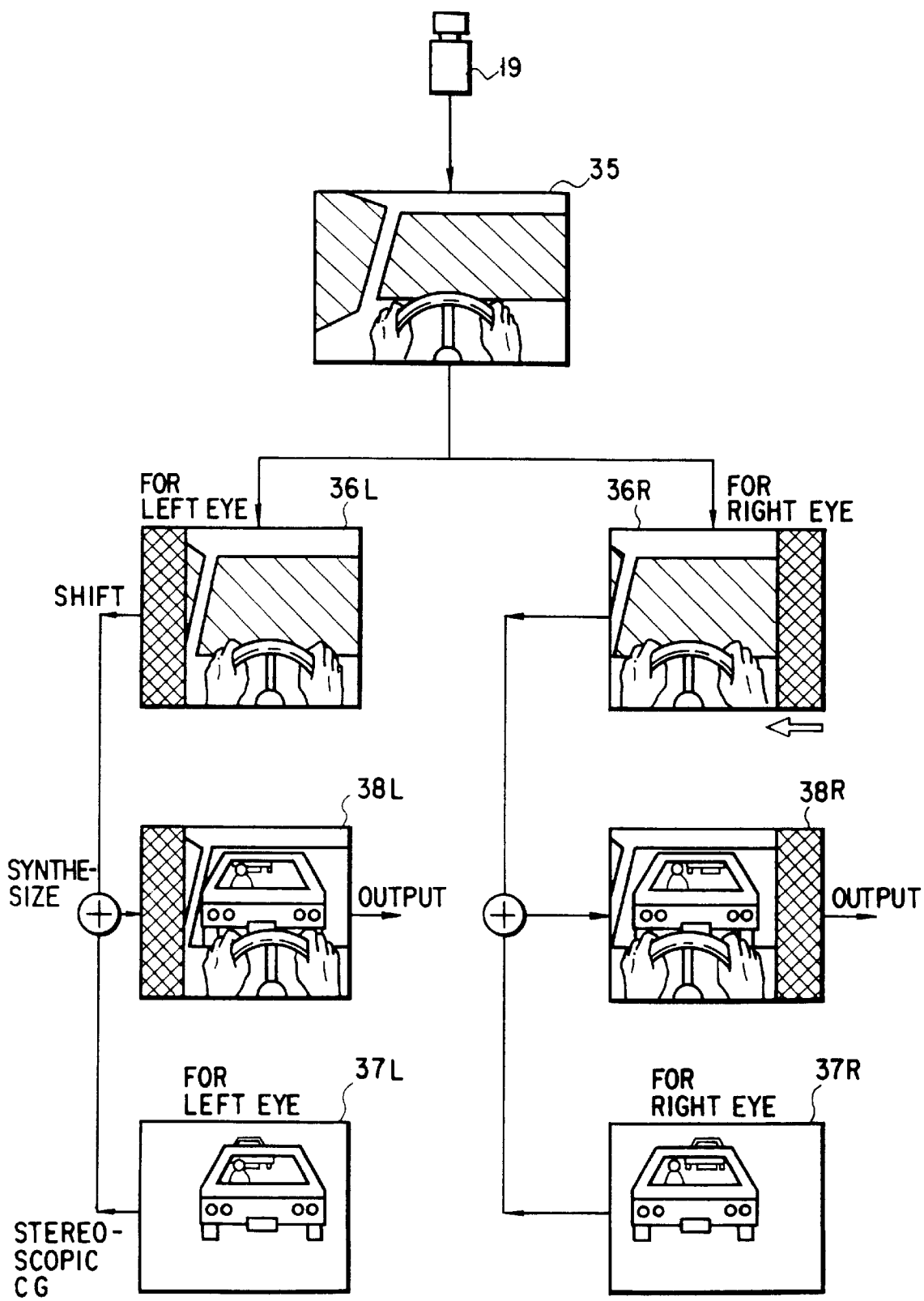
F I G. 6

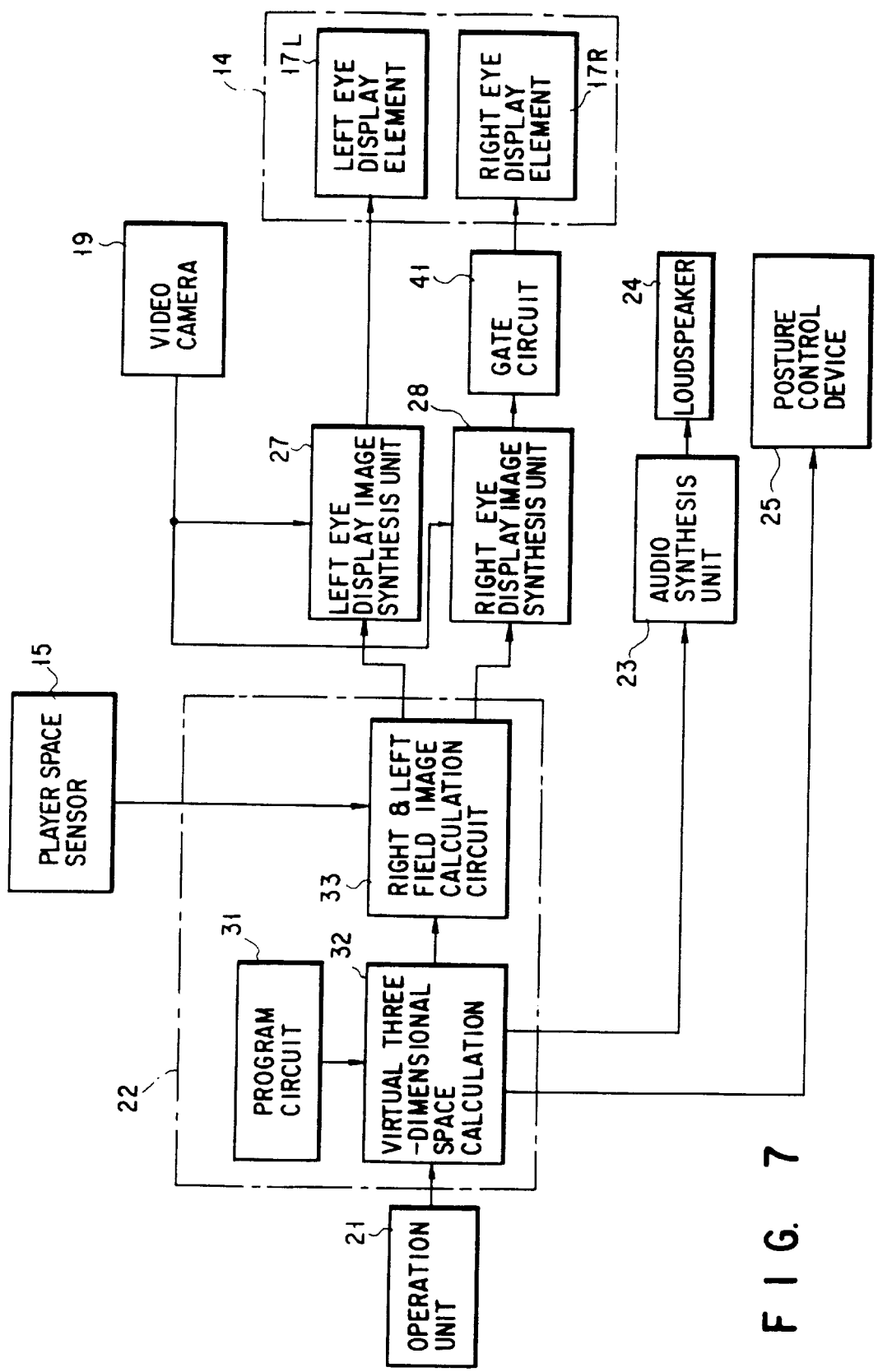
F I G. 7

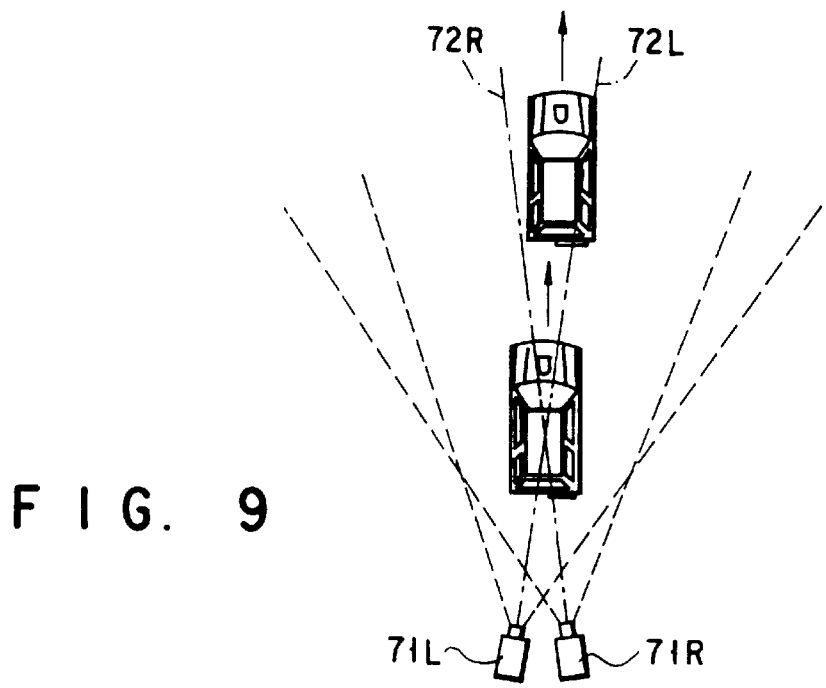
F I G. 9
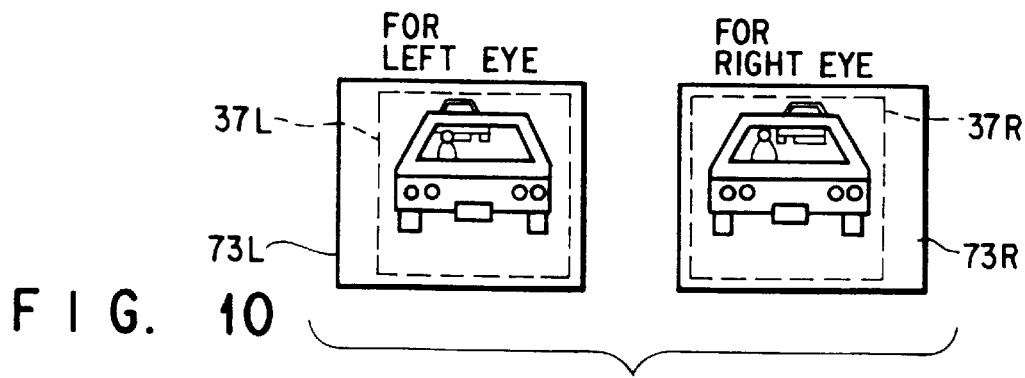
F I G. 10
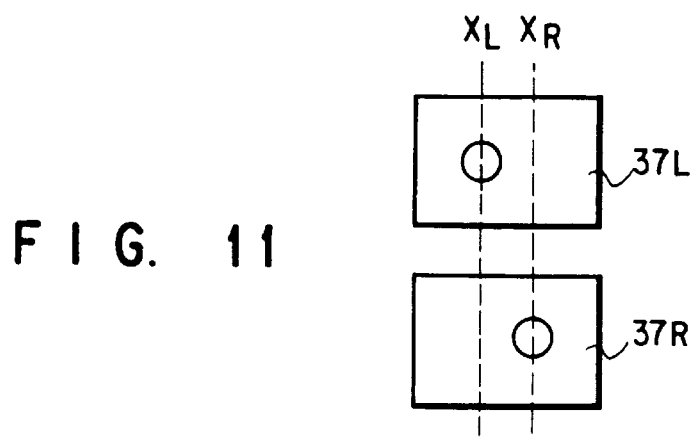
F I G. 11

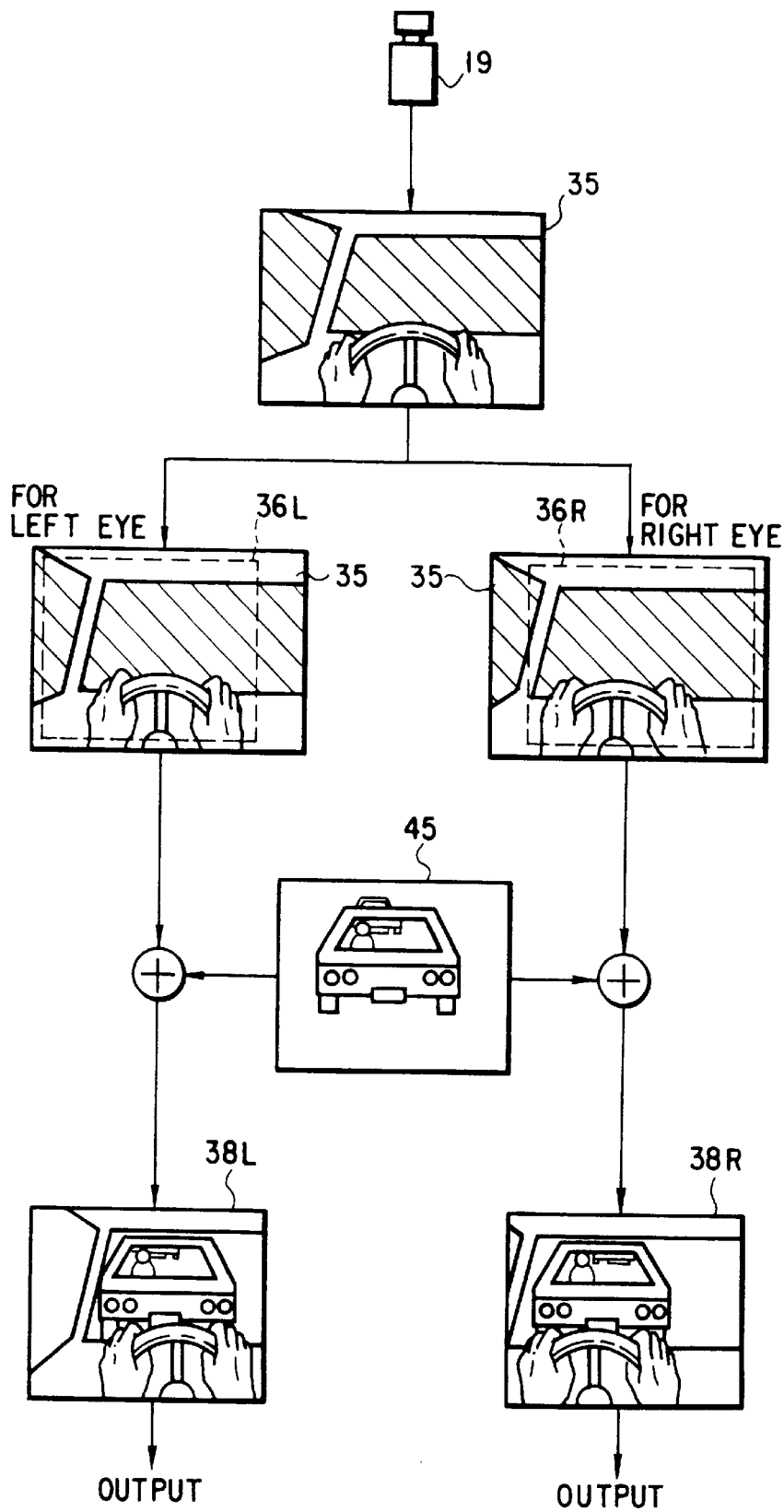
F I G. 13

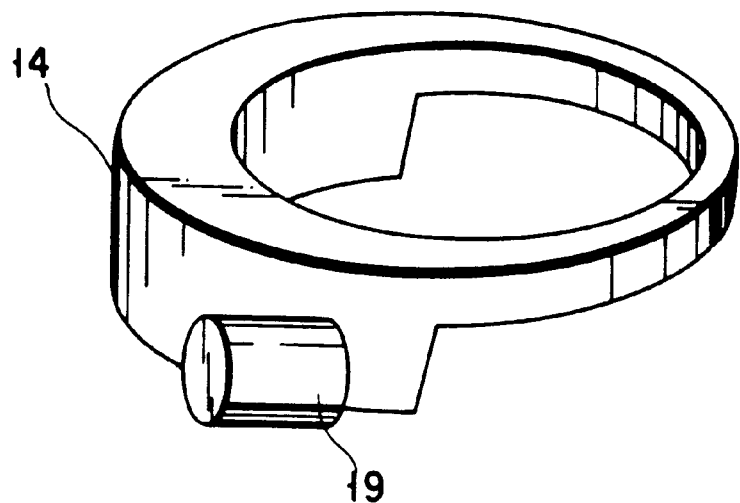
F I G. 14
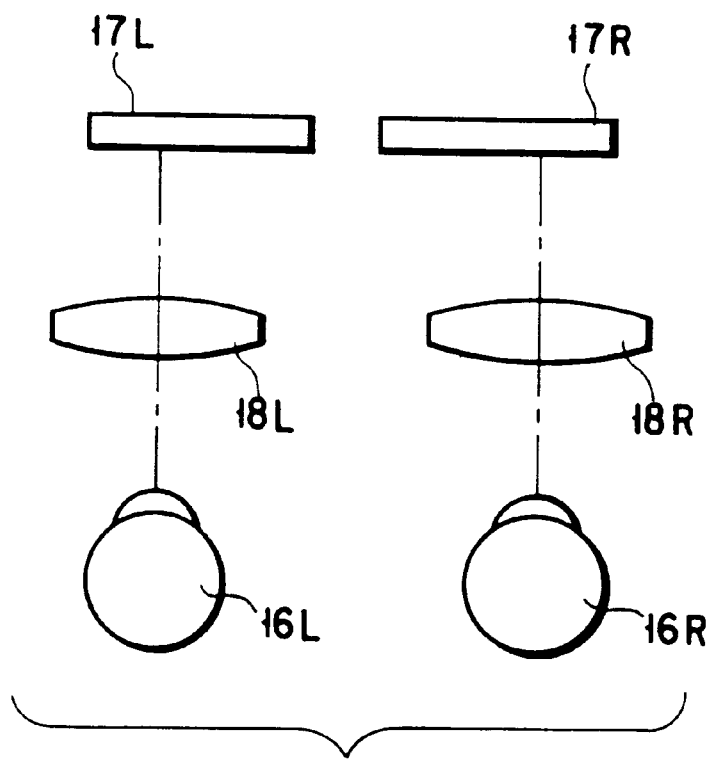
F I G. 17

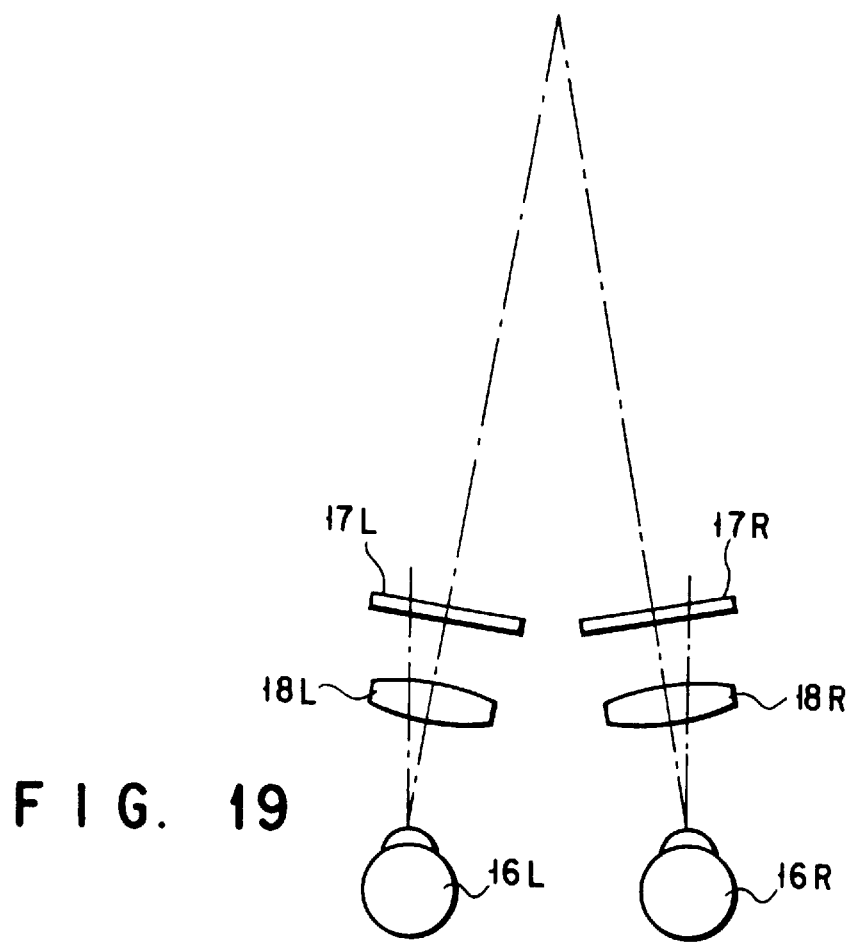
F I G. 19
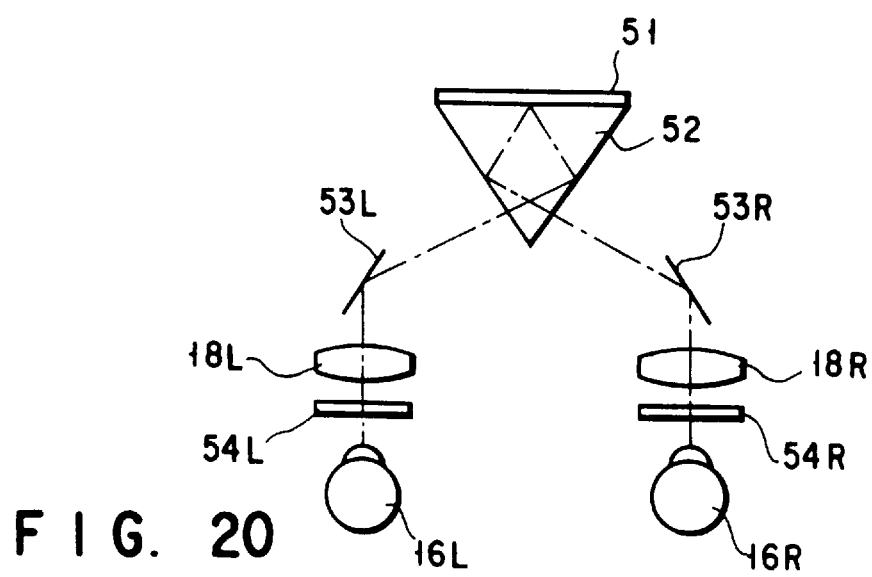
F I G. 20

STEREOSCOPIC VIDEO DISPLAY APPARATUS WHICH FUSES REAL SPACE IMAGE AT FINITE DISTANCE

BACKGROUND OF THE INVENTION

1. Field of the Invention

The present invention relates to a stereoscopic video display apparatus and, more particularly, to a stereoscopic video display apparatus for synthesizing and displaying different video signals.

2. Description of the Related Art

In recent years, as a kind of stereoscopic video display apparatus, virtual reality apparatuses that allow a user to experience virtual reality such as a game machine, system kitchen, flight simulator, drive simulator, and the like are put into practical applications.

As such virtual reality apparatus, Jpn. Pat. Appln. KOKAI No. 6-176131 discloses a technique that draws the virtual reality close to real world.

In this technique, for example, as a driving game machine, a video camera is arranged on a head-mounted body that a player wears so as to be located in the vicinity of the view point position of the player, and senses the racing vehicle, the steering wheel, and the hands of the player as real space images with a blue mat as a background.

These real space images and right and left virtual space images generated by the computer graphics are chromakey-synthesized and are stereoscopically displayed.

However, in the above-mentioned driving game machine disclosed in Jpn. Pat. Appln. KOKAI No. 6-176131, since the real space images sensed by the video camera arranged in the vicinity of the view point position of the player are directly synthesized with the right and left virtual space images and are displayed, the real space images are always displayed at identical horizontal positions on the right and left display screens.

More specifically, when the player faces forward, the steering wheel is displayed at the central portions of the horizontal scanning lines on the right and left display screens.

For this reason, when the player observes the images displayed on the right and left display screens, the steering wheel as a real space image is fused at the infinity position, and is displayed as one quite different from that in real world in practice.

SUMMARY OF THE INVENTION

The present invention has been made in consideration of the above-mentioned conventional problems and has as its object to provide a stereoscopic video display apparatus which is appropriately constituted to draw the virtual reality close to real world.

In order to achieve the above object, according to the present invention, there is provided a stereoscopic video display apparatus comprising:

single image sensing means for sensing a real image;

real space video signal processing means for generating right and left eye first video signals including corresponding images at different horizontal positions by processing a real space video signal from the image sensing means;

image signal generation means for generating right and left eye second image signals including the corresponding images at different horizontal positions;

right eye video signal synthesis means for generating a right eye display signal by synthesizing the right eye second image signal generated by the image signal generation means with a partial region of the right eye first video signal generated by the real space video signal processing means;

left eye video signal synthesis means for generating a left eye display signal by synthesizing the left eye second image signal generated by the image signal generation means with a partial region of the left eye first video signal generated by the real space video signal processing means; and video display means for displaying the right and left display signals generated by the right and left eye video signal synthesis means and guiding displayed images to right and left eyeballs of an observer, wherein the right and left eye video signal synthesis means respectively generate the right and left eye display signals so that an image sensed by the image sensing means is fused at finite distance.

Furthermore, according to the present invention, there is provided a stereoscopic video display apparatus comprising:

head-mounted video display means mounted to cover a field of view of an observer and having video display means for displaying corresponding images on right and left eyeballs of the observer;

single image sensing means, mounted on the observer, for sensing a real space image seen by the observer;

real space video signal processing means for generating right and left eye first video signals corresponding images at different horizontal positions by processing a real space video signal from the image sensing means;

image signal generation means for generating a second image signal;

right eye video signal synthesis means for generating a right eye display signal by synthesizing the right eye first video signal generated by the real space video signal processing means and the second image signal generated by the image signal generation means; and left eye video signal synthesis means for generating a left eye display signal by synthesizing the left eye first video signal generated by the real space video signal processing means and the second image signal generated by the image signal generation means, wherein the right and left eye display signals respectively generated by the right and left eye video signal synthesis means are displayed on the video display means of the head-mounted video display means, so that an image sensed by the image sensing means is fused at finite distance, and displayed images are guided to the right and left eyeballs of the observer.

Moreover, according to the present invention, there is provided a stereoscopic video display apparatus comprising:

head-mounted video display means mounted to cover a field of view of an observer and having video display means for displaying corresponding images on right and left eyeballs of the observer;

single image sensing means, mounted on the observer, for sensing a real space image seen by the observer;

image signal generation means for generating right and left eye image signals including corresponding images at different horizontal positions, so that an image defined by the left eye image signal is located on the left side relative to an image defined by the right eye image signal;

right eye video signal synthesis means for generating a right eye display signal by synthesizing a real space video signal obtained from the image sensing means and the right eye image signal generated by the image signal generation means; and left eye video signal synthesis means for generating a left eye display signal by synthesizing the real space video signal obtained from the image sensing means and the left eye image signal generated by the image signal generation means, wherein the right and left eye display signals respectively generated by the right and left eye video signal synthesis means are displayed on the video display means of the head-mounted video display means, so that an image sensed by the image sensing means is fused at finite distance, and displayed images are guided to the right and left eyeballs of the observer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated. in and constitute a part of the specification, illustrate presently preferred embodiments of the invention and, together with the general description given above and the detailed description of the preferred embodiments given below, serve to explain the principles of the invention.

FIG. 3 is a block diagram showing the circuit arrangement of a stereoscopic video display apparatus according to the first embodiment;

FIG. 5 is a view for explaining the operation of the apparatus shown in FIG. 3;

FIG. 6 is a view for explaining the second embodiment of the present invention;

FIG. 7 is a block diagram showing the circuit arrangement of a stereoscopic video display apparatus according to the third embodiment of the present invention;

FIG. 9 is a view for explaining the operation of the apparatus shown in FIG. 7;

FIG. 10 is a view for explaining the operation of the apparatus shown in FIG. 7;

FIG. 11 is a view for explaining the operation of the apparatus shown in FIG. 7;

FIG. 13 is a view for explaining the operation of the apparatus shown in FIG. 12;

FIG. 14 is a view showing an example of the attached state of a video camera in the fifth embodiment of the present invention;

FIG. 17 is a schematic view of a stereoscopic video display unit according to the sixth embodiment of the present invention;

FIG. 19 is a schematic view showing a modification of the video display unit; and FIG. 20 is a schematic view showing another modification of the video display unit.

DETAILED DESCRIPTION OF THE PREFERRED EMBODIMENTS

Figure 1:
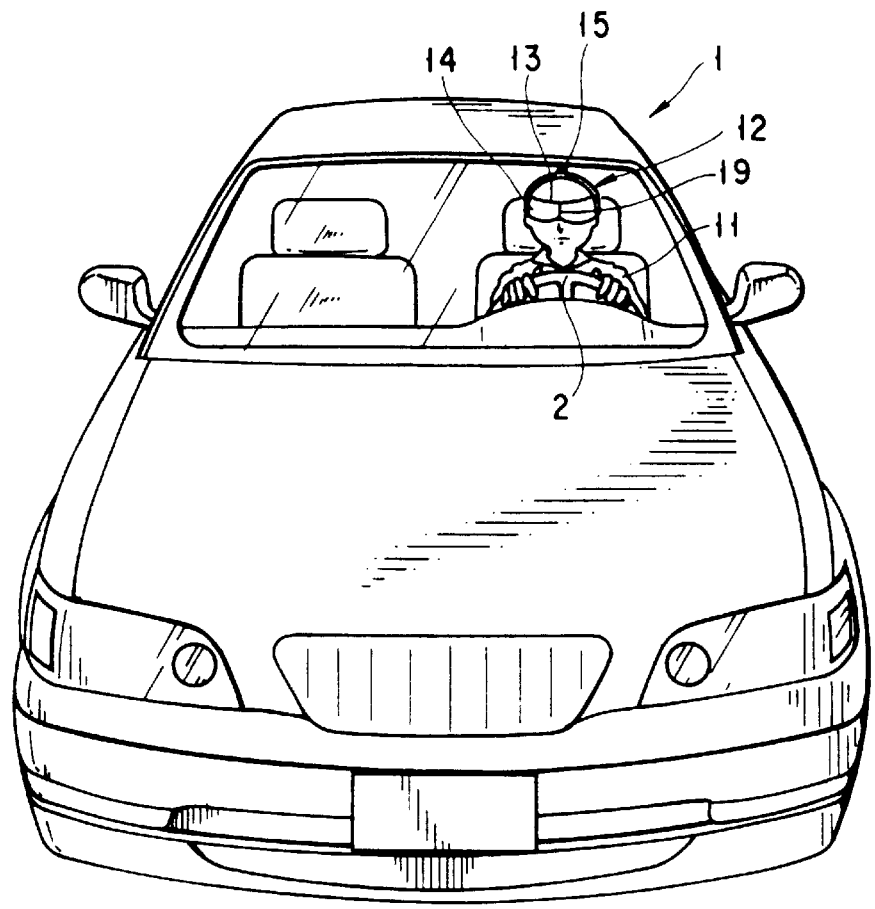
FIG. 1 is a view for explaining the first embodiment of the present invention.

Reference will now be made in detail to the presently preferred embodiments of the invention as illustrated in the accompanying drawings, in which like reference characters designate like or corresponding parts throughout the several drawings.

The preferred embodiments of the present invention will be described hereinafter with reference to the accompanying drawings.

FIG. 1 shows the first embodiment of the present invention.

In this embodiment, the present invention is applied to a virtual reality apparatus as a driving game machine, and a vehicle 1 is arranged in a dome (not shown) having a blue mat inner wall or is designed to have blue mat windshield glass portions.

The vehicle 1 has a steering wheel 2 as in an actual vehicle, and has a shift lever, an accelerator pedal, a brake pedal, a rear-view mirror, door mirrors, various kinds of meters, and the like, although not shown.

A posture control apparatus is arranged in the lower portion of the vehicle 1, although not shown, and virtually controls the posture and the acceleration of the vehicle 1 in correspondence with, e.g., game situations such as the road surface state, changes in road, and the like, and the operations of the steering wheel, accelerator pedal, brake pedal, and the like.

On the other hand, a player 11 who sits at the driver's seat of the vehicle 1 to play the driving game wears a head-mounted device 12.

The head-mounted device 12 has goggles 13 that the player 11 puts on his or her head portion, and a video display unit 14 that the player 11 wears on his or her face.

The goggles 13 have, on their top portion, a space sensor 15 for detecting the three-dimensional position information of the player 11.

Loudspeakers (not shown) for outputting an audio sound according to the game are provided to the two ear portions of the goggles 13.

Note that another space sensor (not shown) which detects three-dimensional position information together with the space sensor 15 is fixed, e.g., outside the vehicle 1.

Depending on the method of detecting the three-dimensional position information, the vehicle body of the vehicle 1 may often disturb detection. In such case, the vehicle 1 may be of open car type or sun roof type.

Figure 2:
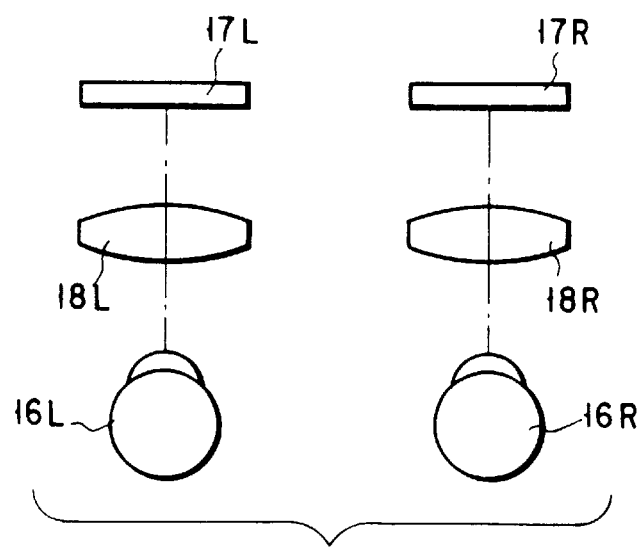
FIG. 2 is a schematic view of a video display unit shown in FIG. 1.

The video display unit 14 comprises display elements 17R and 17L each comprising, e.g., a color liquid crystal display element, and eyepiece optical systems 18R and 18L for guiding the images displayed on these elements to the corresponding eyeballs in an enlarged scale in correspondence with right and left eyeballs 16R and 16L, as shown in the schematic view of FIG. 2.

Furthermore, the video display unit 14 comprises a video camera 19 in the vicinity of the view point position of the player 11 and at nearly the central position between the right and left eyeballs to agree with the field-of-view direction of the player 11.

In this embodiment, the right and left display elements 17R and 17L are arranged, so that their centers in the horizontal direction agree with the visual axes of the corresponding eyeballs.

FIG. 3 is a block diagram showing the circuit arrangement of the stereoscopic video display apparatus according to the first embodiment of the present invention.

The stereoscopic video display apparatus comprises an operation unit 21, a virtual field image calculation unit 22, the player space sensor 15, an audio synthesis unit 23, loudspeakers 24, a posture control device 25, the video camera 19, a right & left image processing unit 26, a left eye display image synthesis unit 27, a right eye display image synthesis unit 28, and the video display unit 14.

The operation unit 21 accommodates the respective operation means such as the steering wheel 2, shift lever, accelerator pedal, brake pedal, and the like, which are equipped in the vehicle 1 shown in FIG. 1 and are operated by the player 11, and supplies various operation signals from these operation means to the virtual field image calculation unit 22.

The virtual field image calculation unit 22 calculates a virtual image that can be observed by the player 11 in the virtual three-dimensional space, and has a program circuit 31, a virtual three-dimensional space calculation circuit 32, and a right & left field image calculation circuit 33.

The program circuit (storage medium) 31 stores the calculation program for the driving game, and the program information is output to the virtual three-dimensional space calculation circuit 32.

The virtual three-dimensional space calculation circuit 32 calculates the virtual three-dimensional space which is set to be superposed on the real three-dimensional space and represents the game space, and generates audio information and a posture control signal in correspondence with the progress of the game.

The image information that represents the virtual three-dimensional space output from the virtual three-dimensional space calculation circuit 32 is supplied to the right & left field image calculation circuit 33.

The audio information output form the virtual three-dimensional space calculation circuit 32 is supplied to the loudspeakers 24 attached to the goggles 13 via the audio synthesis unit 23, and is output as an actual sound.

The posture control signal output from the virtual three-dimensional space calculation circuit 32 is supplied to the posture control device 25 to control the posture of the vehicle 1.

The right & left field image calculation circuit 33 coordinate-converts the image information of the virtual three-dimensional space output from the virtual three-dimensional space calculation circuit 32 on the basis of the three-dimensional information of the player 11 output from the player space sensor 15, thus generating right and left eye virtual field image signals that can be actually seen from the right and left eyeballs of the player 11.

The left eye virtual field image signal is supplied to the left eye display image synthesis unit 27.

The right eye virtual field image signal is supplied to the right eye display image synthesis unit 28.

Figure 4:
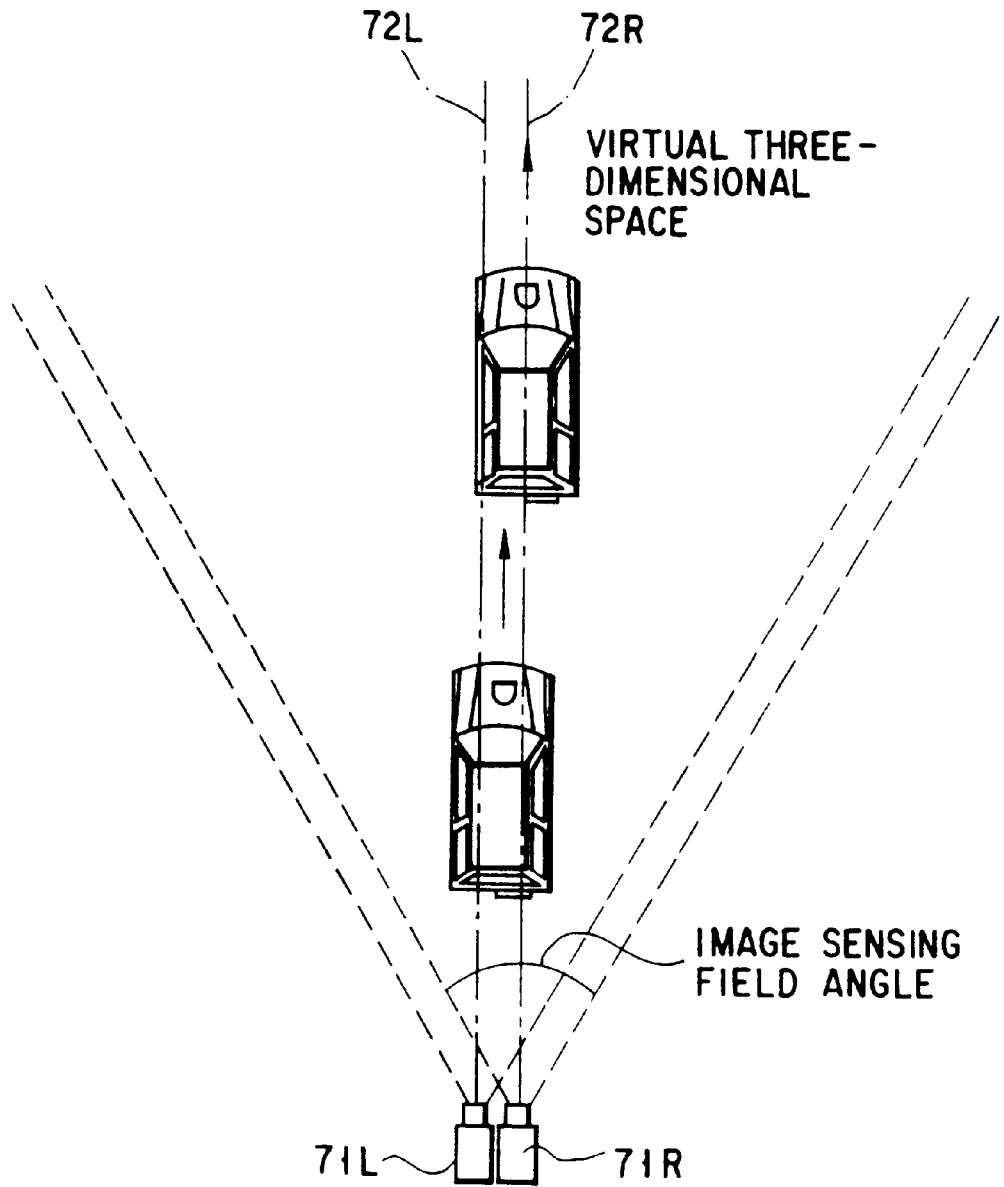
FIG. 4 is a view for explaining the operation of the apparatus shown in FIG. 3.

For example, the virtual three-dimensional space calculation circuit 23 sets two vehicles that are travelling straight in the virtual three-dimensional space, as shown in FIG. 4.

The image data of the virtual three-dimensional space is converted into two-dimensional image data as if the virtual three-dimensional space were sensed by right and left eye virtual cameras 71R and 71L arranged at different view points, thus generating right and left eye virtual field image signals.

Note that the two virtual cameras 71R and 71L are arranged, so that their optical axes 72R and 72L extend parallel to each other.

On the other hand, a real space video signal which is obtained from the video camera 19 and agrees with the field-of-view direction of the player 11 is supplied to the right & left image processing unit 26.

The right & left image processing unit 26 processes the real space video signal from the video camera 19 to generate right and left real space video signals that can seen from the right and left eyeballs of the player 11 in practice.

The left eye real space video signal is supplied to the left eye display image synthesis unit 27.

The right eye real space video signal is supplied to the right eye display image synthesis unit 28.

The left eye display image synthesis unit 27 chromakey-synthesizes the left eye virtual field image signal with the blue mat portion of the left eye real space video signal from the right & left image processing unit 26, and supplies the synthesized video signal to the left eye display element 17L of the video display unit 14, thus displaying an image.

Similarly, the right eye display image synthesis unit 28 chromakey-synthesizes the right eye virtual field image signal with the blue mat portion of the right eye real space video signal from the right & left image processing unit 26, and supplies the synthesized video signal to the right eye display element 17R of the video display unit 14, thus displaying an image.

The operation of the right & left image processing unit 26, and the right and left eye display image synthesis units 28 and 27 will be explained below with reference to FIG. 5.

In this embodiment, assume that the sizes of frames defined by the right and left virtual field image signals from the right & left image calculation circuit 33 equal those of the right and left display elements 17R and 17L in the video display unit 14, and the frame, in the horizontal direction, of the real space video signal sensed by the video camera 19 is larger than these frames.

Note that the size of the frame means the image taking field angle, and in this embodiment, the image taking field angle of the video camera 19 is larger than those of the virtual cameras 71R and 71L shown in FIG. 4.

Referring to FIG. 5, a real space image 35 is obtained from the video camera 19, and is supplied to the right & left image processing unit 26.

The real space image 35 includes blue mat front and side windshield glass portions since the vehicle 1 is set in the blue mat dome.

On the other hand, since the video camera 19 is located at nearly the middle position between the right and left eyeballs of the player 11, the image of the steering wheel 2 is located at the lower side of the central portion of the frame while the player 11 faces forward (front).

The right & left image processing unit 26 generates right and left eye real space images 36R and 36L having the frame size equal to those of the right and left display elements 17R and 17L by extracting them from the real space image 35 from the video camera 19, and supplies these images to the right and left eye display image synthesis units 28 and 27.

More specifically, in this case, as for the left eye real space image 36L, the left-side region of the real space image 35 is extracted, as indicated by a broken line in FIG. 5, so that the steering wheel is located on the right side in the image.

On the other hand, as for the right eye real space image 36R, the right-side region of the real space image 35 is extracted, as indicated by a broken line in FIG. 5, so that the steering wheel is located on the left side in the image.

The left eye display image synthesis unit 27 chromakey-synthesizes the left eye real space image 36L from the right & left image processing unit 26 with a left eye virtual field image (stereoscopic CG) 37L from the virtual field image calculation unit 22 to generate a left eye display image 38L by setting images of the corresponding portions of the stereoscopic CG 37L into the blue mat portions of the left eye real space image 36L. The unit 27 then displays the image 38L on the left eye display element 17L of the video display unit 14.

Similarly, the right eye display image synthesis unit 28 chromakey-synthesizes the right eye real space image 36R from the right & left image processing unit 26 with a right eye virtual field image (stereoscopic CG) 37R from the virtual field image calculation unit 22 to generate a right eye display image 38R by setting images of the corresponding portions of the stereoscopic CG 37R into the blue mat portions of the right eye real space image 36R. The unit 27 then displays the image 38R on the right eye display element 17R of the video display unit 14.

In this manner, the right and left display elements 17R and 17L of the video display unit 14 respectively display the right and left display images 38R and 38L, thus fusing the real space image sensed by the video camera 19 at finite distance.

More specifically, when the player 11 plays a game with his or her face facing forward, the image of the steering wheel 2 is fused to be located in front of the virtual field image synthesized on the front windshield glass portion. Hence, the player can experience virtual reality in a state closer to real world.

FIG. 6 is a view for explaining the second embodiment of the present invention.

In this embodiment, assume that the size of the frame of the real space image 35 sensed by the video camera 19 equals those of the right and left virtual field images 37R and 37L from the right & left field image calculation circuit 33 and those of the right and display elements 17R and 17L in the video display unit 14.

In the circuit arrangement shown in FIG. 3, the right & left image processing unit 26 generates right and left real space images 36R and 36L by shifting the real space image 35 from the video camera 19 in the opposite directions in correspondence with the right and left eyes.

More specifically, as for the left eye real space image 36L, the real space image 35 is shifted to the right so that the image of the steering wheel is located on the right side in the image.

On the other hand, as for the right eye real space image 36R, the real space image 35 is shifted to the left so that the image of the steering wheel is located on the left side in the image.

Subsequently, as in the first embodiment, the left eye display image synthesis unit 27 chromakey-synthesizes the left eye real space image 36L from the right & left image processing unit 26 with the left eye CG 37L from the virtual field image calculation unit 22, and displays the synthesized image on the left eye display element 17L of the video display unit 14.

Also, the right eye display image synthesis unit 28 chromakey-synthesizes the right eye real space image 36R from the right & left image processing unit 26 with the right eye CG 37R from the virtual field image calculation unit 22, and displays the synthesized image on the right eye display element 17R of the video display unit 14.

As in the first embodiment, when the left and right display images 38R and 38L are displayed in this manner, the real space image sensed by the video camera 19 can be fused at finite distance.

For example, when the player 11 plays a game with his or her face facing forward, the image of the steering wheel 2 is fused to be located in front of the virtual field image synthesized on the front windshield glass portion. Hence, the player can experience virtual reality in a state closer to real world.

In this embodiment, since the real space image 35 from the video camera 19 is shifted in opposite directions, i.e., to the right and left to respectively obtain right and left eye images, the right and left eye display images 38R and 38L have non-image display portions on their right and left sides, respectively.

However, since these portions are located on the outer side in the fusion state, they do not pose any serious problem in observation.

FIG. 7 is a block diagram showing the circuit arrangement of a stereoscopic video display apparatus according to the third embodiment of the present invention.

In this stereoscopic video display apparatus, the right & left image processing unit 26 is omitted, and the real space video signal from the video camera 19 is parallelly supplied to the right and left display image synthesis units 28 and 27 in the circuit arrangement shown in FIG. 3.

The left eye display image synthesis unit 27 chromakey-synthesizes the left eye virtual field image signal from the right & left field image calculation circuit 33 with the blue mat portions of the real space video signal from the video camera 19, and supplies the synthesized image to the left eye display element 17L of the video display unit 14, thus displaying an image. Also, the right eye display image synthesis unit 28 chromakey-synthesizes the right eye virtual field image signal from the right & left field image calculation circuit 33 with the blue mat portions of the real space video signal from the video camera 19, and supplies the synthesized image to the right eye display element 17R of the video display unit 14, thus displaying an image.

Assume that the size of the frame of the real space image sensed by the video camera 19 equals those of the right and left virtual field image signals from the right & left field image calculation circuit 33, and the sizes, in the horizontal direction, of the frames of the right and left display elements 17R and 17L in the video display unit 14 are larger than these frame sizes.

Figure 8:
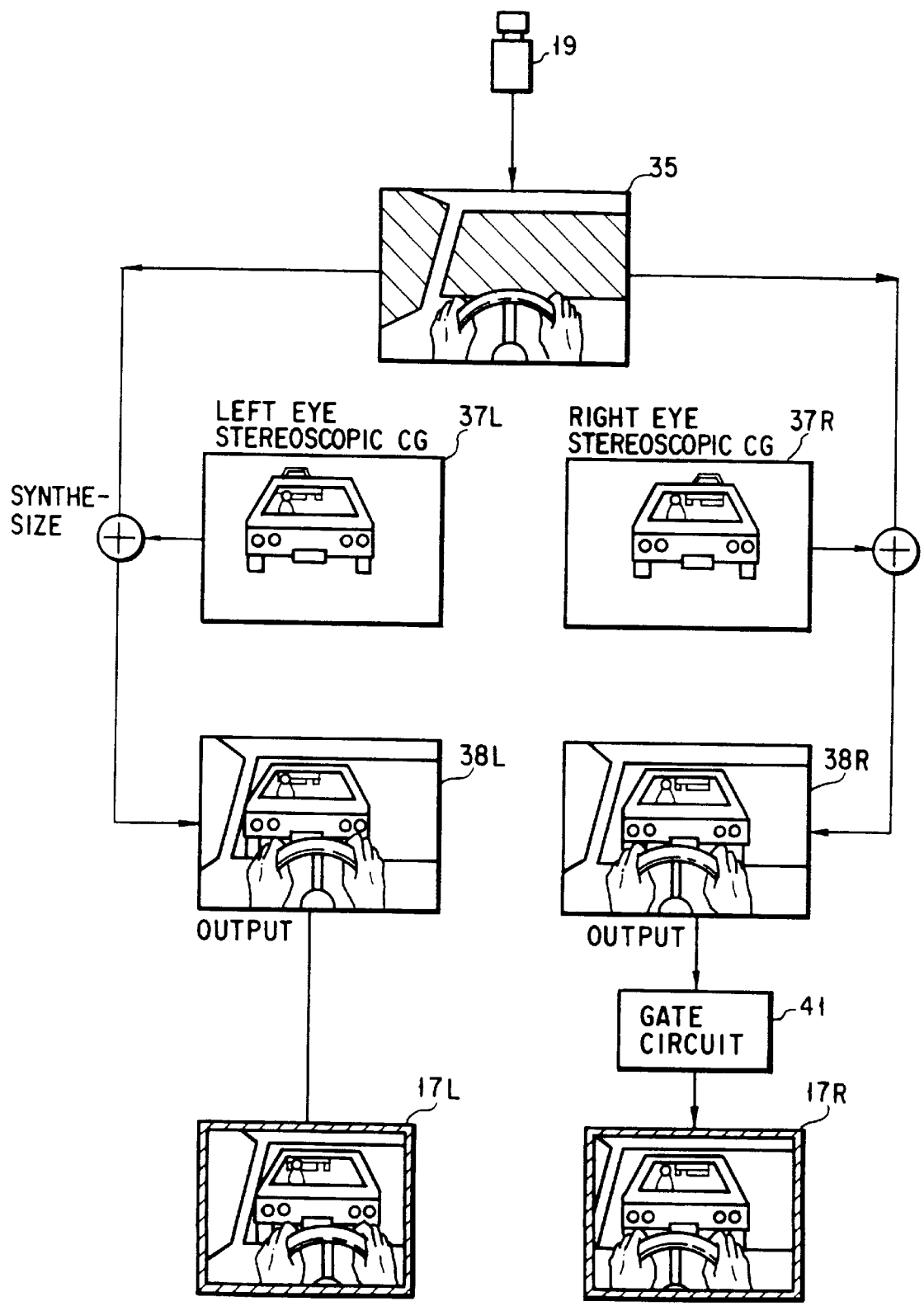
FIG. 8 is a view for explaining the operation of the apparatus shown in FIG. 7.

The operation of this embodiment will be described below with reference to FIG. 8.

In this embodiment, the right and left display image synthesis units 28 and 27 chromakey-synthesize the real space image 35 from the video camera 19 with the right and left stereoscopic CGs 37R and 37L from the right & left field image calculation circuit 33, thus generating right and left display images 38R and 38L.

In this embodiment, for example, in the right & left field image calculation circuit 33, right and left virtual cameras 71R and 71L are set, so that their optical axes 72R and 72L are not parallel to each other and cross each other, as shown in FIG. 9, thus obtaining right and left stereoscopic CGs 37R and 37L.

Alternatively, the right and left virtual cameras 71R and 71L are set so that their optical axes 72R and 72L extend parallel to each other as in FIG. 4, so as to generate right and left images 73R and 73L (the same as the stereoscopic CGs 37R and 37L shown in FIG. 5), as shown in FIG. 10. Thereafter, the left and right regions of the right and left eye images 73R and 73L are respectively trimmed to obtain CGs 37R and 37L, as indicated by broken lines in FIG. 10.

In either method, in the right and left CGs 37R and 37L to be generated, upon comparing the positions, $X_R$ and $X_L$, of the corresponding images, $X_L$ is located on the left side relative to $X_R$, as schematically shown in FIG. 11.

An image signal of the left eye display image 38L from the left eye display image synthesis unit 27 is directly supplied to the left eye display element 17L of the video display unit 14.

Also, an image signal of the right eye display image 38R from the right eye display image synthesis unit 28 is input to a gate circuit 41 to remove the start portions in the respective horizontal lines of the image signal, and thereafter, the image signal is supplied to the right eye display element 17R of the video display unit 14.

Note that the sizes, in the horizontal direction, of the frames of the right and left display elements 17R and 17L of the video display unit 14 are smaller than those, in the horizontal direction, of the frames of the right and left display images 38R and 38L output from the right and left display image synthesis units 28 and 27.

Therefore, the left eye display element 17L displays an image in which the image of the steering wheel 2 is offset to the right side, since the left eye display image 38L is shifted to the left side as a result of removing the right-side portion of the left eye display image 38L from the left eye display image synthesis unit 27.

On the other hand, the right eye display element 17R displays an image in which the image of the steering wheel 2 is offset to the left side, since the right eye display image 38R is shifted to the right side as a result of removing the start portions of the respective horizontal lines of the image signal of the right eye display image 38R from the right eye display image synthesis unit 28 by the gate circuit 41.

As in the above embodiments, when the right and left display images 38R and 38L are displayed in this manner, the real space image sensed by the video camera 19 is fused at finite distance.

For example, when the player 11 plays a game with his or her face facing forward, the image of the steering wheel 2 is fused to be located in front of the virtual field image synthesized on the front windshield glass portion. Hence, the player can experience virtual reality in a state closer to real world.

Figure 12:
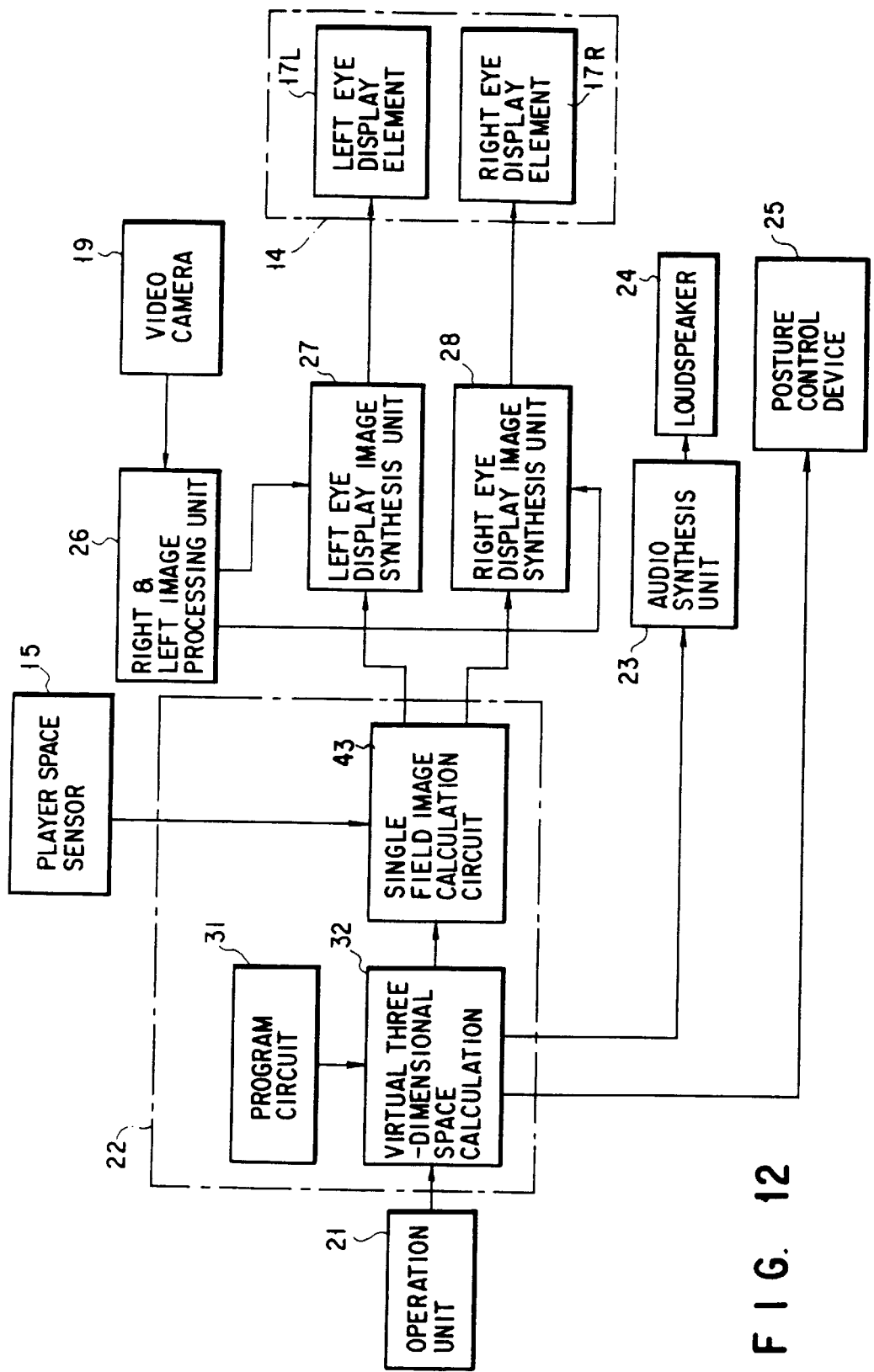
FIG. 12 is a block diagram showing the circuit arrangement of a stereoscopic video display apparatus according to the fourth embodiment of the present invention.

FIG. 12 is a block diagram showing the circuit arrangement of a stereoscopic video display apparatus according to the fourth embodiment of the present invention.

This stereoscopic video display apparatus comprises a single field image calculation circuit 43 in place of the right & left field image calculation circuit 33 that constitutes the virtual field image calculation unit 22 in the circuit arrangement shown in FIG. 3.

With this arrangement, image information of the virtual three-dimensional space from the virtual three-dimensional space calculation circuit 32 is coordinate-converted on the basis of the three-dimensional position information of the player 11 from the player space sensor 15, thus generating a single virtual field image signal.

The virtual field image signal is parallelly supplied to the right and left display image synthesis units 28 and 27.

Other arrangements are the same as those in FIG. 3.

More specifically, in this embodiment, the right & left image processing 26 generates right and left real space images 36R and 36L having frame sizes equal to those of the right and left display elements 17R and 17L by extracting them from the real space image 35 from the video camera 19, as shown in FIG. 13, as in the first embodiment.

These right and left real space images 36R and 36L are respectively supplied to the right and left display image synthesis units 28 and 27.

The left display image synthesis unit 27 generates a left display image 38L by chromakey-synthesizing the left eye real space image 36L and a virtual field image 45 from the single field image calculation circuit 43, and displays the image 38L on the left display element 17L.

Similarly, the right display image synthesis unit 27 generates a right display image 38R by chromakey-synthesizing the right eye real space image 36R and the virtual field image 45 from the single field image calculation circuit 43, and displays the image 38R on the right display element 17R.

Therefore, in this embodiment, for example, when the player plays a game with his or her face facing forward, the right and left display images 38R and 38L are fused so that the image of the steering wheel 2 is located in front of the virtual field image synthesized to the front windshield glass portion, and hence, the player can experience virtual reality in a state closer to real world.

In the fourth embodiment, the right & left image processing unit 26 generates right and left real space images 36R and 36L by extracting them from the real space image 35 from the video camera 19. Alternatively, the right and left real space images 36R and 36L may be generated by shifting the real space image 35 from the video camera 19 in the right and left directions, as in the second embodiment.

In the fifth embodiment of the present invention, the video camera 19 is attached to the video display unit 14, so as to be located on the right- or left-side head portion of the player 11, e.g., on the left-side head portion of the player 11, as shown in FIG. 14.

Figure 15:
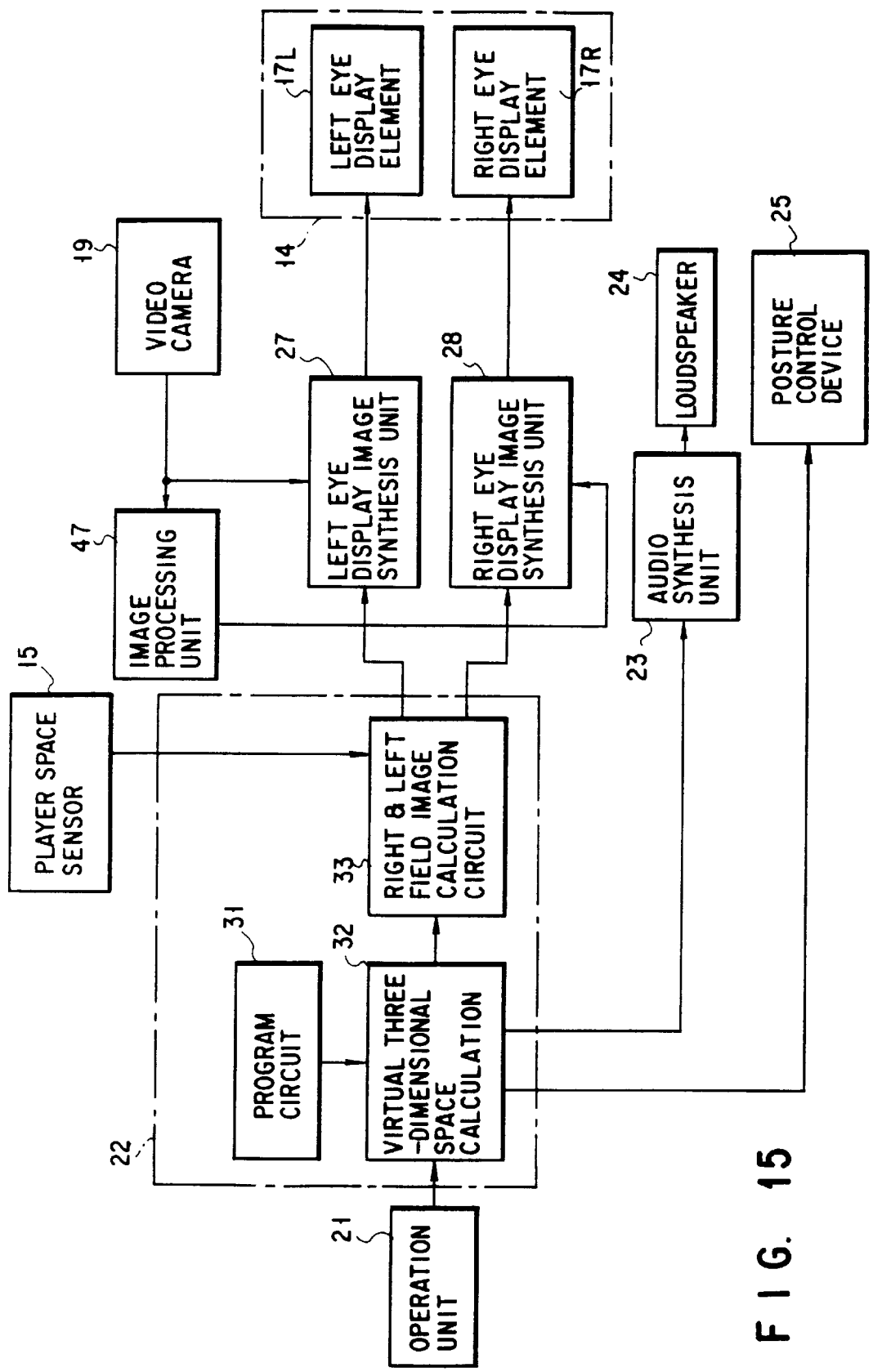
FIG. 15 is a block diagram showing the circuit arrangement of a stereoscopic video display apparatus according to the fifth embodiment.

FIG. 15 is a block diagram showing the circuit arrangement of the video display apparatus when the video camera 19 is attached to the position, outside the left eyeball, of the video display unit 14, as shown in FIG. 14.

The video display apparatus supplies a real space video signal from the video camera 19 to the left eye display image synthesis unit 27, and supplies it to the right display image synthesis unit 28 via an image processing unit 47. Other circuit arrangements are the same as those in FIG. 3.

Figure 16:
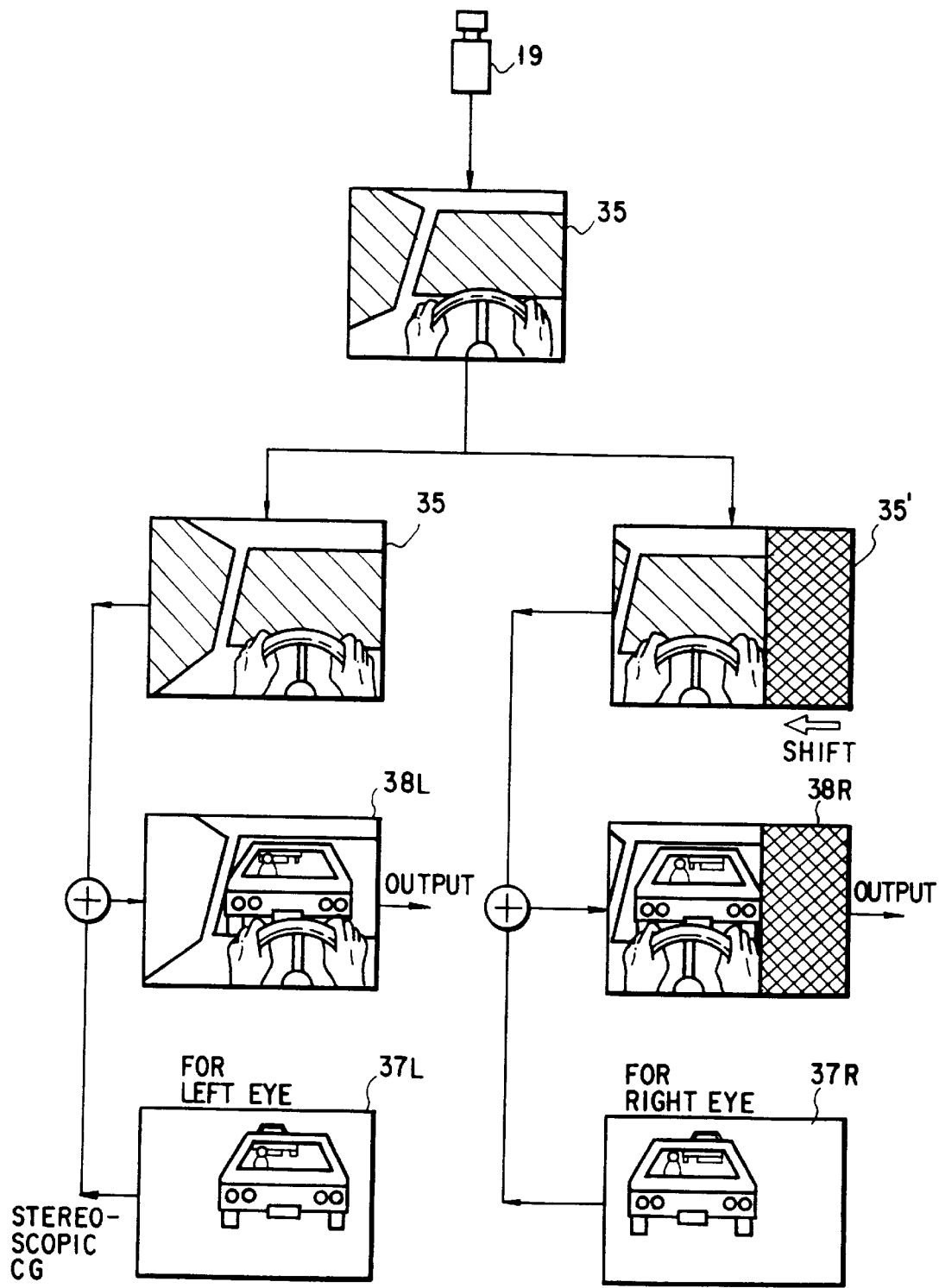
FIG. 16 is a view for explaining the operation of the apparatus shown in FIG. 15.

The operation of this embodiment will be described below with reference to FIG. 16.

In this embodiment, assume that the size of the frame of the real space image 35 sensed by the video camera 19 equals those of the right and left virtual field images 37R and 37L from the right & left field image calculation circuit 33, and those of the right and left display elements 17R and 17L in the video display unit 14.

The real space image 35 obtained from the video camera 19 is offset to the left side with respect to the field of view of the player 11 since the video camera 19 is attached to the position outside the left eyeball.

Therefore, for example, when the player faces forward, an image in which the image of the steering wheel 2 is located on the right side of the screen is displayed.

The left eye display image synthesis unit 27 that receives the real space image 35 from the video camera 19 chromakey-synthesizes the real space image 35 and the left eye virtual field image 37L from the right & left field image calculation circuit 33 to generate a left eye display image 38L, and supplies it to the left eye display element 17L of the video display unit 14, thus displaying an image.

On the other hand, the image processing unit 47 that receives the real space image 35 from the video camera 19 shifts the real space image 35 to the left side.

With this processing, for example, when the player faces forward, the image of the steering wheel 2 is located on the left side of the screen.

The left eye display image synthesis unit 28 that receives an image 35' shifted by the image processing unit 47 chromakey-synthesizes the received image with the right eye virtual field image 37R from the right & left field image calculation circuit 33 to generate a right eye display image 38R, and supplies it to the right eye display element 17R of the video display unit 14, thus displaying an image.

According to this embodiment, as in the above embodiment, the right and left display images 38R and 38L are fused with the real space image sensed by the video camera 19 at finite distance.

For example, when the player plays a game with his or her face facing forward, the display images are fused so that the image of the steering wheel 2 is located in front of the virtual field image synthesized to the front windshield glass portion, and hence, the player can experience virtual reality in a state closer to real world.

In this embodiment, since the real space image 35 from the video camera 19 is shifted to the left, a non-image display portion is formed on the right side of the right eye display image 38R.

However, since this portion is located on the outer side in the fusion state, it does not seriously disturb the observation of the player 11.

In the above-mentioned embodiments, as shown in FIG. 2, the right and left display elements 17R and 17L are arranged, so that their centers in the horizontal direction agree with the visual axes of the corresponding right and left eyeballs 16R and 16L.

In the sixth embodiment of the present invention, as shown in FIG. 17, the right and left display elements 17R and 17L are arranged to be offset inwardly with respect to the optical axes of the corresponding right and left eyepiece optical systems 18R and 18L.

In this case, for example, the size of the frame of the real space image 35 sensed by the video camera 19 is set to equal those of the right and left virtual field images 37R and 37L from the right & left field image calculation circuit 33 and those of the right and left display elements 17R and 17L in the video display unit 14.

When images are displayed on the right and left display elements 17R and 17L by adopting the circuit arrangement from which the gate circuit 41 is omitted from that shown in FIG. 7, the player can experience virtual reality.

Figure 18:
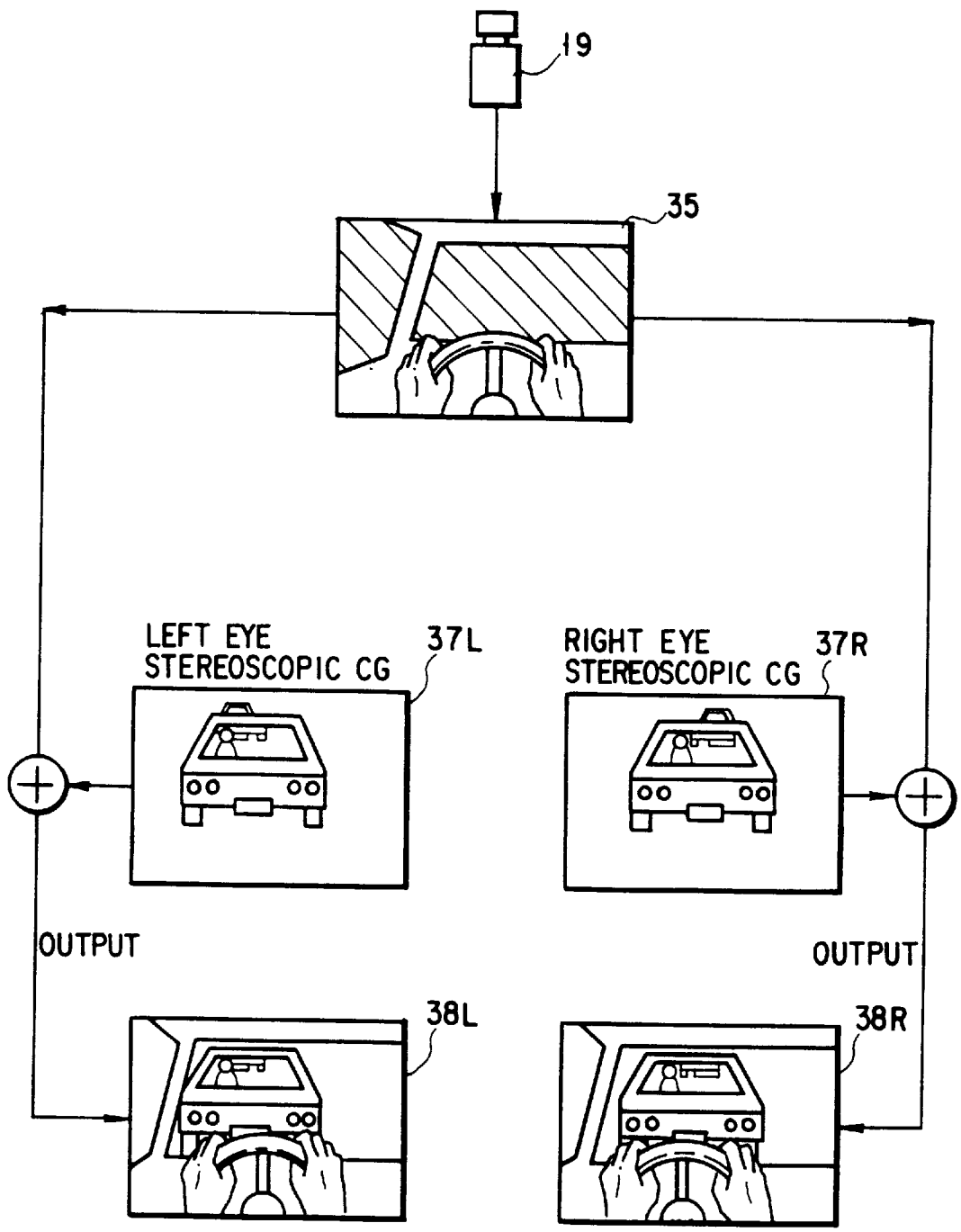
FIG. 18 is a view for explaining the operation of the sixth embodiment.

More specifically, as shown in FIG. 18, the right and left display image synthesis units 28 and 27 that parallelly receive the real space image 35 from the video camera 19 respectively supply the right and left display images 38R and 38L, generated by respectively chromakey-synthesizing the image 35 with the right and left stereoscopic CGs 37R and 37L from the right & left field image calculation circuit 33, to the right and left display elements 17R and 17L in the video display unit 14, thus displaying images thereon.

With this display operation, for example, even when the image of the steering wheel 2 is located at the center in each of the right and left display images 38R and 38L, since the right and left display elements 17R and 17L are arranged to be offset inwardly with respect to the optical axes of the corresponding right and left eyepiece optical systems 18R and 18L, the image of the steering wheel 2 is displayed inside the visual axes of the right and left eyeballs 16R and 16L.

Therefore, since the right and left display images 38R and 38L are fused so that the image of the steering wheel 2 is located in front of the virtual field image synthesized to the front windshield glass portion, the player 11 can experience virtual reality in a state closer to real world, as in the above-mentioned embodiments.

Also, according to this embodiment, since the right & left image processing unit 26 shown in FIG. 3 and the gate circuit 41 shown in FIG. 7 can be omitted, the circuit arrangement can be simplified.

The sixth embodiment described above can be similarly applied when the right and left eyepiece optical systems 18R and 18L are obliquely set so that their optical axes extend toward each other to eventually cross each other, as shown in, e.g., FIG. 19.

Note that the present invention is not limited to the above-mentioned driving game but can also be applied to various other virtual reality apparatuses such as a system kitchen, flight simulator, and the like, and other stereoscopic video display apparatuses.

In each of the above-mentioned embodiments, the display elements 17R and 17L are arranged in correspondence with the right and left eyeballs 16R and 16L. Alternatively, as shown in FIG. 20, a single display element 51 may be arranged. More specifically, as shown in FIG. 20, an image displayed on the display element 51 is guided to the left eyeball 16L via a common prism 52, a left eye reflection mirror 53L, the left eye eyepiece optical system 18L, and a left eye shutter 54L, and is also guided to the right eyeball 16R via the prism 52, a right eye reflection mirror 53R, the right eye eyepiece optical system 18R, and a right eye shutter 54R.

The right and left display image synthesis units 28 and 27 alternately output right and left display images to the display element 51 to display them in a field sequential manner, and the right and left shutters 54R and 54L are alternately opened/closed in synchronism with the display operations, so that the player 11 can observe the image.

In this way, as described in detail above, according to the present invention, since other images are synthesized with the real space image sensed by the image sensing means, so that the real space image is fused at finite distance, if the present invention is applied to a virtual reality apparatus, virtual reality that is closer to real world can be experienced.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A stereoscopic video display apparatus comprising:

single image sensing means for sensing a real image;

real space video signal processing means for generating right and left eye first video signals including corresponding images at different horizontal positions by processing a real space video signal from said image sensing means;

image signal generation means for generating right and left eye second image signals including the corresponding images at different horizontal positions;

right eye video signal synthesis means for generating a right eye display signal by synthesizing the right eye second image signal generated by said image signal generation means with a partial region of the right eye first video signal generated by said real space video signal processing means;

left eye video signal synthesis means for generating a left eye display signal by synthesizing the left eye second image signal generated by said image signal generation means with a partial region of the left eye first video signal generated by said real space video signal processing means;

video display means for displaying the right and left display signals generating by said right and left eye video signal synthesis means and guiding displayed images to right and left eyeballs of an observer; and control means for controlling the right and left eye video signal synthesis means so that a horizontal position difference between the corresponding images included in the right and left eye first video signals is smaller than a horizontal position difference between the corresponding images included in the right and left eye second video signals, thereby enabling an image corresponding to the first video signals to be fused at a position closer to a viewer than an image corresponding to the second video signals.

2. An apparatus according to claim 1, wherein said real space video signal processing means processes the real space video signal from said image sensing means, so that the horizontal positions of the corresponding images in the right and left eye first video signals draw relatively close to each other.

3. An apparatus according to claim 2, wherein said real space video signal processing means comprises at least one of:

means for generating the right eye first video signal by shifting a real space image defined by the real space video signal from said image sensing means to a left direction; and means for generating the left eye first video signal by shifting a real space image defined by the real space video signal from said image sensing means to a right direction.

4. An apparatus according to claim 2, wherein said real space video signal processing means comprises at least one of:

means for generating the right eye first video signal by extracting a right-side region of a real space image defined by the real space video signal from said image sensing means; and means for generating the left eye first video signal by extracting a left-side region of the real space image defined by the real space video signal from said image sensing means.

5. An apparatus according to claim 2, wherein said image sensing means is arranged on a right or left side head portion of the observer, and said real space video signal processing means distributes the real space video signal from said image sensing means to two routes, and generates the right and left eye first video signals including the corresponding images at the different horizontal positions by processing the real space video signal in one route.

6. A stereoscopic video display apparatus comprising:

head-mounted video display means mounted to cover a field of view of an observer and having video display means for displaying corresponding images on right and left eyeballs of the observer;

single image sensing means, mounted on the observer, for sensing a real space image seen by the observer;

real space video signal processing means for generating right and left eye first video signals corresponding images at different horizontal positions by processing a real space video signal from said image sensing means;

image signal generation means for generating a second image signal;

right eye video signal synthesis means for generating a right eye display signal by synthesizing the right eye display signal by synthesizing the right eye first video signal generated by said real space video signal generated by said real space video signal processing means and the second image signal generated by said image signal generation means;

left eye video signal synthesis means for generating a left eye display signal by synthesizing the left eye first video signal generated by said real spaced video signal processing means and the second image signal generated by said image signal generation means, and control means for controlling the right and left eye video signal synthesis means so that an image corresponding to the first video signal can be fused at a position closer to a viewer than an image corresponding to the second video signal.

7. An apparatus according to claim 6, wherein said real space video signal processing means processes the real space video signal from said image sensing means, so that the horizontal positions of the corresponding images in the right and left eye first video signals draw relatively close to each other.

8. An apparatus according to claim 7, wherein said real space video signal processing means comprises at least one of:

means for generating the right eye first video signal by shifting a real space image defined by the real space video signal from said image sensing means to a left direction; and means for generating the left eye first video signal by shifting a real space image defined by the real space video signal from said image sensing means to a right direction.

9. An apparatus according to claim 7, wherein said real space video signal processing means comprises at least one of:

means for generating the right eye first video signal by extracting a right-side region of a real space image defined by the real space video signal from said image sensing means; and means for generating the left eye first video signal by extracting a left-side region of a real space image defined by the real space video signal from said image sensing means.

10. An apparatus according to claim 7, wherein said image sensing means is arranged on a right or left side head portion of the observer, and said real space video signal processing means distributes the real space video signal from said image sensing means to two routes, and generates the right and left eye first video signals including the corresponding images at the different horizontal positions by processing the real space video signal in one route.

11. A stereoscopic video display apparatus comprising:

head-mounted video display means mounted to cover a field of view of an observer and having video display means for displaying corresponding images on right and left eyeballs of the observer;

said video display means comprising a right eye display element which corresponds to the right eyeball of the observer and displays the right eye display signal, a right eye eyepiece optical system for guiding an image displayed on said right eye display element toward the right eyeball of the observer, a left eye display element which corresponds to the left eyeball of the observer and displays the left eye display signal, and a left eye eyepiece optical system for guiding an image displayed on said left eye display element toward the left eyeball of the observer, said right and left eye display elements being arranged to be decentered inwardly with respect to optical axes of the corresponding right and left eye eyepiece optical systems;

single image sensing means, mounted on the observer, for sensing a real space image seen by the observer and for generating a real space video signal;

image signal generation means for generating right and left eye image second signals including corresponding images at different horizontal positions, so that an image defined by the left eye image signal is located on the left side relative to an image defined by the right eye image signal;

right eye video signal synthesis means for generating a right eye display signal by synthesizing the real space video signal obtained from said image sensing means and the right eye image signal generated by said image signal generation means;

left eye video signal synthesis means for generating a left eye display signal by synthesizing the real space video signal obtained from said image sensing means and the left eye image signal generated by said image signal generation means, and control means for controlling the right and left eye video signal synthesis means so that an image corresponding to the real space video signal can be fused at a position closer to a viewer than an image corresponding to the signals generated by the image signal generation means.

12. An apparatus according to claim 11, further comprising means for shifting a display image defined by said right eye display image to the left side with respect to said video display means, and shifting a display image defined by the left eye display signal to the right side with respect to said video display means.

13. A stereoscopic video display apparatus comprising:

head-mounted video display means mounted to cover a field of view of an observer and having video display means for displaying corresponding images on right and left eyeballs of the observer;

said video display means comprising a right eye display element which corresponds to the right eyeball of the observer and displays the right eye display signal, a right eye eyepiece optical system for guiding an image displayed on said right eye display element toward the right eyeball of the observer, a left eye display element which corresponds to the left eyeball of the observer and displays the left eye display signal, and a left eye eyepiece optical system for guiding an image displayed on said left eye display element toward the left eyeball of the observer;

said right and left eye eyepiece optical systems arranged so that optical axes thereof extend toward each other to cross each other;

single image sensing means, mounted on the observer, for sensing a real space image seen by the observer and for generating a real space video signal;

image signal generation means for generating right and left eye image second signals including corresponding images at different horizontal positions, so that an image defined by the left eye image signal is located on the left side relative to an image defined by the right eye image signal;

right eye video signal synthesis means for generating a right eye display signal by synthesizing the real space video signal obtained from said image sensing means and the right eye image signal generated by said image signal generation means;

left eye video signal synthesis means for generating a left eye display signal by synthesizing the real space video signal obtained from said image sensing means and the left eye image signal generated by said image signal generation means; and control means for controlling the right and left eye video signal synthesis means so that an image corresponding to the real space video signal can be fused at a position closer to a viewer than an image corresponding to the signals generated by the image signal generation means.

14. An apparatus according to claim 13, further comprising means for shifting a display image defined by said right eye display image to the left side with respect to said video display means, and shifting a display image defined by the left eye display signal to the right side with respect to said video display means.

* * * * *